S. ANDREWS.
Improvement in Apparatus for Fumigating.
No. 131,075. Patented Sep. 3, 1872.
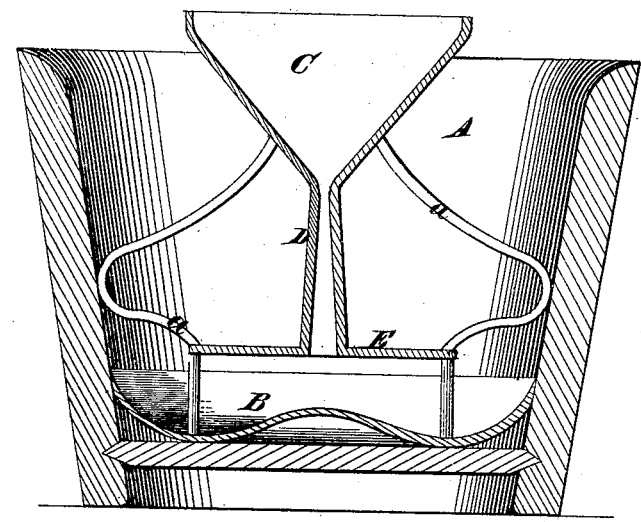
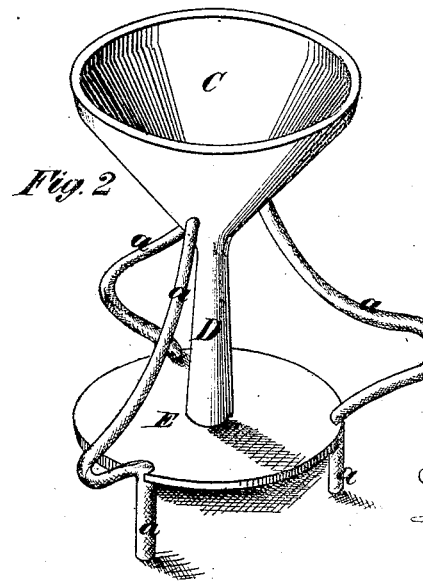

UNITED STATES PATENT OFFICE.

SOLOMON ANDREWS, OF PERTH AMBOY, NEW JERSEY.

IMPROVEMENT IN APPARATUS FOR FUMIGATING.

Specification forming part of Letters Patent No. 131,075, dated September 3, 1872.

Specification describing an Apparatus for Fumigating and Perfuming, invented by SOLOMON ANDREWS, M. D., of Perth Amboy, in the county of Middlesex and State of New Jersey.

My invention relates to an apparatus to fumigate or disinfect, by the use of chemicals suited to the purpose, and the generation and diffusion of gases and perfumes for sanitary purposes in a more convenient, economical, and useful manner than has hitherto been done.

Figure 1 is a vertical section of the entire apparatus excepting the bail or handle. Fig. 2 is a perspective view of the tripod or funnel constituting a part of the same.

A is a wooden pail having a false bottom or dish, B, made of sheet-lead or other suitable material, in the form shown at Fig. 1; C, a funnel having three legs, $a\ a\ a$, which stand on the false bottom or dish B inside of the pail, and project sidewise sufficient to come in contact with the sides of the pail so as to prevent its upsetting. D is the lower part or tube of the funnel, but inverted as compared with a common funnel, the base of the cone being at the bottom. It has a very small aperture at the apex, where it connects with the bowl of the funnel, which hole enlarges to the bottom. E is a disk placed horizontally, through the center of which the conical tube passes. It is near the bottom of the tube, and is joined at its periphery to the three legs.

The present method of fumigations for vessels' holds, cellars, and other places is to mix a quantity of chloride of lime with water in any common receptacle and then dash in a quantity of oil of vitriol and get out of the way as quickly as possible to avoid respiration of the fumes. In some places, especially in the holds of vessels, this is not only wasteful and inconvenient, but also dangerous to the operator. The sudden elimination of a large quantity of disinfecting-gas is not so effectual as a more gradual liberation. Besides this, there is a waste of materials, because they are generally used in improper proportions, and also because the sudden production of a large quantity of the product (especially if it be insoluble, like sulphate of lime) interferes with the thorough mixture of the materials used, and no one can remain to stir up the mixture.

In this fumigator the materials are gradually brought into contact near the bottom of the vessel, and by the force of the gases generated a current is set up radiating from the center, which brings the ingredients into contact with each other till neutralization takes place.

To use this apparatus or fumigator I put in a common-sized water-pail about one pound of chloride of lime and two gallons of water and stir up the mixture; then set in the tripod or funnel, and pour into it sulphuric acid or common oil of vitriol, about half the measure or equal the weight of the chloride of lime. The acid should be free from all dirt or substances which might clog up the small aperture at the bottom of the bowl of the funnel. The acid runs slowly through the small aperture, meets the chloride below the aperture, and makes its exit at the bottom of the conical tube underneath the disk. There the chemical action goes on; the gas, escaping around the periphery of the disk and rising upward, produces a current or circulation in the fluids until all the materials are brought together to form a neutral salt. By leaving off the disk the current is not so general, and does not therefore produce so thorough a contact of the materials, because the gas rises more immediately around the tube of the funnel. It, however, answers a very good purpose. The small orifice of the funnel through which the acid runs must be above the surface of the fluid mixture in the pail, else the chloride would meet the acid above the said orifice or small aperture, and the residuum, being insoluble, would clog up the hole. By making the lower end of the funnel or tube conical, the outlet enlarging to the base, the residuum, when first formed in it, is forced down by the pressure of gas to the bottom of the tube, the acid following, and the current set up as described.

When sulphuric or other mineral acid is used the bottom dish, (which by its form aids in giving direction to the current,) as also the funnel, legs, and disk, should be made of lead, gutta-percha, glass, earthenware, or other material which resists the action of the acids.

Other materials than those above named are used for fumigating purposes or disinfecting purposes—for example, carbolate of lime to produce phenol or carbolic-acid fumes, and common salt with sulphuric acid to generate chlorine gas, &c.; but when any one of the ingredients is a liquid this fumigator is applicable to them, as also to the production and diffusion of odors and perfumes.

What I claim as my invention, and desire to secure by Letters Patent, is—

1. The elimination of gases for fumigating or disinfecting purposes in the slow and effectual manner hereinbefore described, or by analogous means.

2. The apparatus or fumigator described, for the uses and purposes mentioned in this specification.

SOLOMON ANDREWS.

Witnesses:
ISAAC SOFIELD,
HENRY T. PEIRCE.